(12) United States Patent
Sengoku et al.

(10) Patent No.: US 7,093,975 B2
(45) Date of Patent: Aug. 22, 2006

(54) SEMICONDUCTOR INTEGRATED CIRCUIT WITH SIMPLY CONFIGURED TEMPERATURE DETECTION CIRCUIT

(75) Inventors: Tatsuo Sengoku, Hyogo (JP); Hitoshi Kurosawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/730,123

(22) Filed: Dec. 9, 2003

(65) Prior Publication Data
US 2004/0174923 A1 Sep. 9, 2004

(30) Foreign Application Priority Data
Mar. 7, 2003 (JP) .............................. 2003-061017

(51) Int. Cl.
*G01K 7/01* (2006.01)
(52) U.S. Cl. ..................................... 374/170
(58) Field of Classification Search ................ 327/26, 327/31, 37; 374/170
See application file for complete search history.

(56) References Cited

U.S. PATENT DOCUMENTS

| | | | | |
|---|---|---|---|---|
| 4,237,420 A | * | 12/1980 | Ebihara et al. | 374/170 |
| 4,873,518 A | * | 10/1989 | Mehnert | 327/31 |
| 5,708,375 A | * | 1/1998 | Lemmens | 327/36 |
| 5,899,570 A | * | 5/1999 | Darmawaskita et al. | 374/170 |
| 6,169,442 B1 | * | 1/2001 | Meehan et al. | 327/512 |
| 6,695,475 B1 | * | 2/2004 | Yin | 374/171 |

FOREIGN PATENT DOCUMENTS

| | | |
|---|---|---|
| JP | 6085159 | 3/1994 |
| JP | 7-249739 A | 9/1995 |
| JP | 7-326714 | 12/1995 |
| KR | 1994-0008090 | 4/1994 |
| KR | 9706604 | 4/1997 |

OTHER PUBLICATIONS

Korean Patent Office. Office Action dated Jan. 27, 2006. Korean Application No. 10-2004-0013420. Applicant, Renesas Technology Corp. English Translation. (2 pages).
Korean Patent Office. Office Action dated Jan. 27, 2006. Korean Application No. 10-2004-0013420. Applicant, Renesas Technology Corp. Korean Language. (2 pages).

* cited by examiner

*Primary Examiner*—G. Bradley Bennett
(74) *Attorney, Agent, or Firm*—Buchanan Ingersoll PC

(57) ABSTRACT

A clock divider circuit outputs a divided clock. A delay circuit is formed of at least one inverter to delay the divided clock to output a delayed, divided clock. An EXOR circuit receives the divided clock and the delayed, divided clock. A pulse width measurement circuit includes an integration circuit receiving a signal output from a logic circuit, and a Schmitt trigger circuit receiving a signal output from the integration circuit. Since the Schmitt trigger circuit's trigger potential is set to have a value corresponding to a predetermined pulse width, the pulse width measurement circuit outputs a signal asserted in response to a signal received from the logic circuit having a pulse with a width of no less than a predetermined value. A latch circuit latches a signal output from the pulse width measurement circuit.

3 Claims, 15 Drawing Sheets

FIG.11A

| LATCH CIRCUIT | VALUE OF SIGNAL HELD |
|---|---|
| LATCH CIRCUIT6a | L |
| LATCH CIRCUIT6b | L |
| LATCH CIRCUIT6c | L |
| LATCH CIRCUIT6d | H |
| . | . |
| . | . |
| . | . |
| LATCH CIRCUIT6m | H |
| LATCH CIRCUIT6n | H |

FIG.11B

| LATCH CIRCUIT | VALUE OF SIGNAL HELD |
|---|---|
| LATCH CIRCUIT6a | L |
| LATCH CIRCUIT6b | H |
| LATCH CIRCUIT6c | H |
| LATCH CIRCUIT6d | H |
| . | . |
| . | . |
| . | . |
| LATCH CIRCUIT6m | H |
| LATCH CIRCUIT6n | H |

SEMICONDUCTOR INTEGRATED CIRCUIT WITH SIMPLY CONFIGURED TEMPERATURE DETECTION CIRCUIT

BACKGROUND OF THE INVENTION

1. Field of the Invention

The present invention relates generally to semiconductor integrated circuits and particularly to semiconductor integrated circuit temperature detection technology or control technology based the temperature detection.

2. Description of the Background Art

In semiconductor integrated circuits, temperature variation contributes to an impaired drive ability of a transistor or the like. This impairs the circuit's performance.

To address this, Japanese Patent Laying-Open No. 7-249739 discloses a temperature detection circuit utilizing that an inverter's transmission delay time varies with temperature.

This allows a semiconductor integrated circuit's internal temperature to be detected.

As described in the document, however, the temperature detection circuit has a complicated configuration as it is configured with a plurality of transmission gates connected.

Furthermore in this temperature detection circuit a range of temperature to be detected can be selected from a plurality of ranges of temperature. More specifically, a plurality of routes are provided with inverters, respectively, and when a range of temperature to be detected is selected a route corresponding to the selected range of temperature is selected and the selected route's inverter is used, while the other routes' inverters are not used. That is, such redundancy disadvantageously increases the circuit's scale.

SUMMARY OF THE INVENTION

The present invention contemplates a semiconductor integrated circuit that can simply be configured to detect temperature.

The present invention in one aspect provides a semiconductor integrated circuit including a temperature detection circuit including: a signal output circuit outputting a first signal having at least one rising or falling portion; a delay circuit formed of at least one inverter to output a delayed version of the first signal; a logic circuit receiving the first signal and the delayed version of the first signal; a pulse width measurement circuit outputting a signal asserted in response to a signal received from the logic circuit having a pulse with a width of no less than a predetermined width corresponding to a temperature desired to be detected; and a latch circuit latching a signal output from the pulse width measurement circuit, the pulse width measurement circuit having an integration circuit receiving a signal output from the logic circuit and a Schmitt trigger circuit receiving a signal output from the integration circuit, the Schmitt trigger circuit's trigger potential being set to have a value corresponding to the predetermined width.

The present invention in another aspect provides a semiconductor integrated circuit including a temperature detection circuit including: a signal output circuit outputting a first signal having at least one rising or falling portion; a plurality of delay circuits connected in series, each formed of at least one inverter to output a delayed version of the first signal; a plurality of logic circuits each receiving the delayed version of the first signal output from a corresponding one of the delay circuits, and the first signal; a plurality of pulse width measurement circuits each outputting a signal asserted in response to a signal received from a corresponding one of the logic circuits having a pulse with a width of no less than a predetermined width corresponding to a temperature desired to be detected; a plurality of latch circuits each latching a signal output from a corresponding one of the pulse width measurement circuits; and a temperature determination circuit counting a logic value of a signal latched by the plurality of latch circuits, and outputting data corresponding to a value thus counted, as data indicative of temperature.

The present invention in still another aspect provides a semiconductor integrated circuit including a temperature detection circuit including: a signal output circuit outputting a first signal having at least one rising or falling portion; a plurality of delay circuits connected in series, each formed of at least one inverter to output a delayed version of the first signal; a plurality of switches each receiving the delayed version of the first signal output from a corresponding one of the delay circuits; a logic circuit receiving the first signal and the delayed version of the first signal output from a conducting one of the plurality of switches; a pulse width measurement circuit outputting a signal asserted in response to a signal received from the logic circuit having a pulse with a predetermined width corresponding to a temperature desired to be detected; a latch circuit latching a signal output from the pulse width measurement circuit; and a temperature determination circuit successively allowing the plurality of switches to conduct, one at a time, starting from the switch corresponding to the delay circuit located at an preceding stage, the temperature determination circuit outputting as data indicative of temperature, data corresponding to a number of the switch allowing the asserted, latched signal to be first detected.

Thus the present semiconductor integrated circuit can simply be configured to detect temperature.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 11A indicates values of signals latched by latch circuits 6a–6n for small temperature variation and FIG. 11B indicates those of signals latched by latch circuits 6a–6n for large temperature variation;

DESCRIPTION OF THE PREFERRED EMBODIMENTS

Hereinafter, the present invention in embodiments will be described with reference to the drawings.

First Embodiment

The present embodiment relates to a microcomputer including a simply configured temperature detection circuit.

Figure 1:
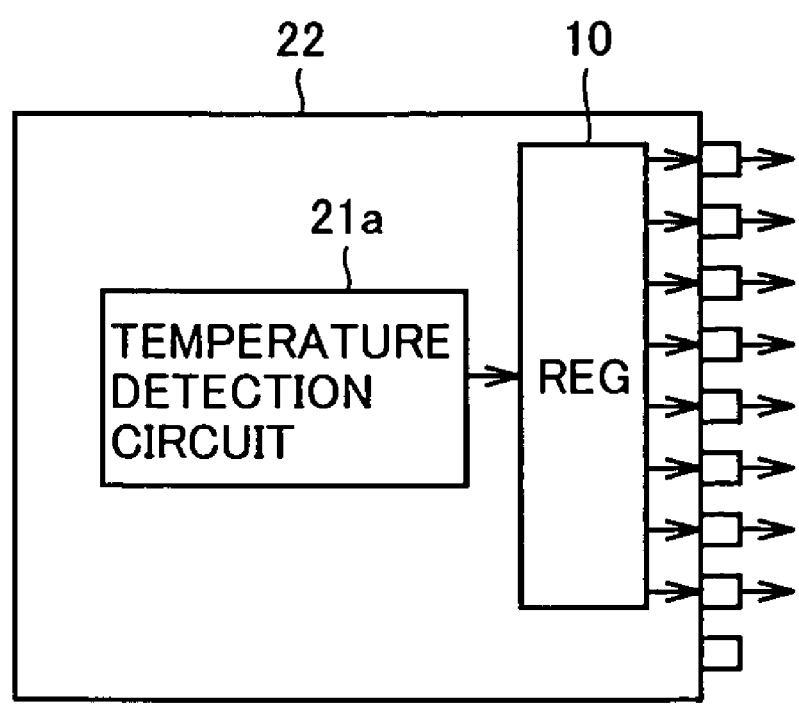
FIG. 1 shows a configuration of a microcomputer of a first embodiment.

FIG. 1 shows a configuration of a microcomputer of the first embodiment. With reference to the figure, a microcomputer 22 includes a temperature detection circuit 21a and a register (REG) 10. Note that although not shown in the figure, microcomputer 22 further includes a central processing unit (CPU) and other components accommodating the application of interest.

Figure 2:
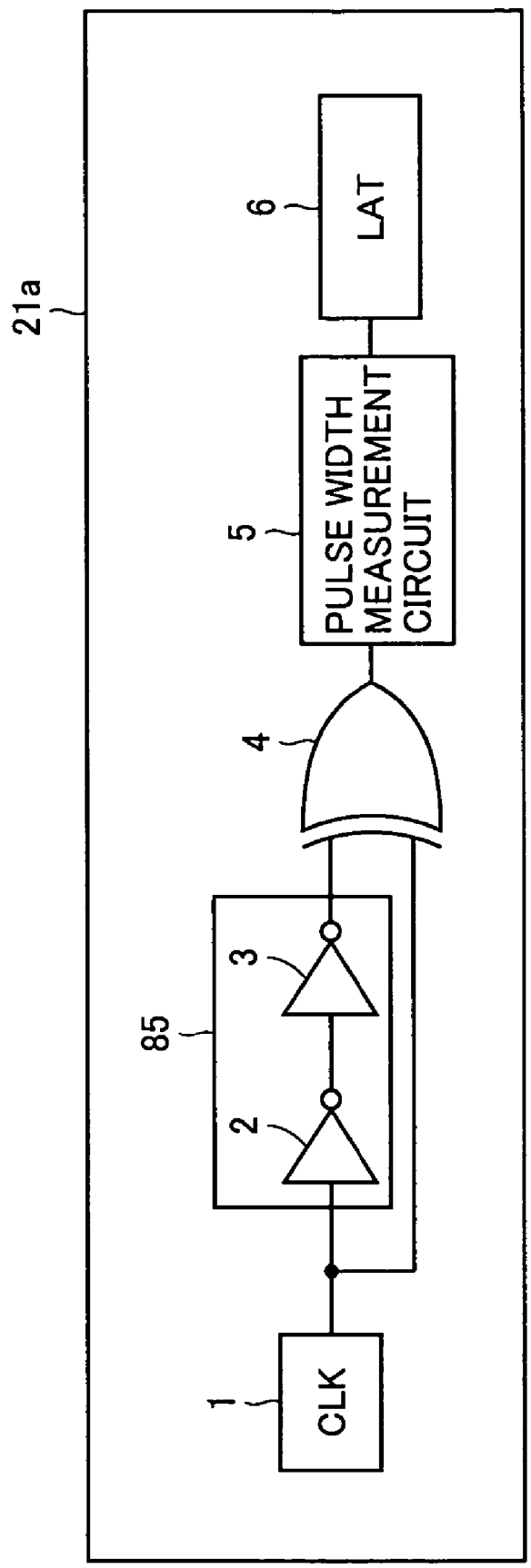
FIG. 2 shows a configuration of a temperature detection circuit of the first embodiment.

FIG. 2 shows a configuration of temperature detection circuit 21a of the first embodiment. With reference to the figure, temperature detection circuit 21a includes a clock divider circuit 1, a delay circuit 85, an EXOR circuit 4, a pulse width measurement circuit 5, and a latch circuit (LAT) 6.

Clock divider circuit 1 receives an external clock provided external to temperature detection circuit 21a and divides the external clock to output a divided clock.

Delay circuit 85 is formed of inverters 2 and 3. The divided clock output from clock divider circuit 1 passes through these inverters. The divided clock is thus delayed and from delay circuit 85a delayed, divided clock is output.

EXOR circuit 4 performs an exclusive OR (EXOR) operation on the divided clock output from clock divider circuit 1 and the delayed, divided clock output from delay circuit 85 and outputs the operation's result.

Pulse width measurement circuit 5 outputs a signal of the high level (assert) when the signal output from EXOR circuit 4 has a pulse width of no less than a predetermined value. Pulse width measurement circuit 5 outputs a signal of the low level (negate) when the signal output from EXOR circuit 4 has a pulse width of less than the predetermined value.

Figure 3:
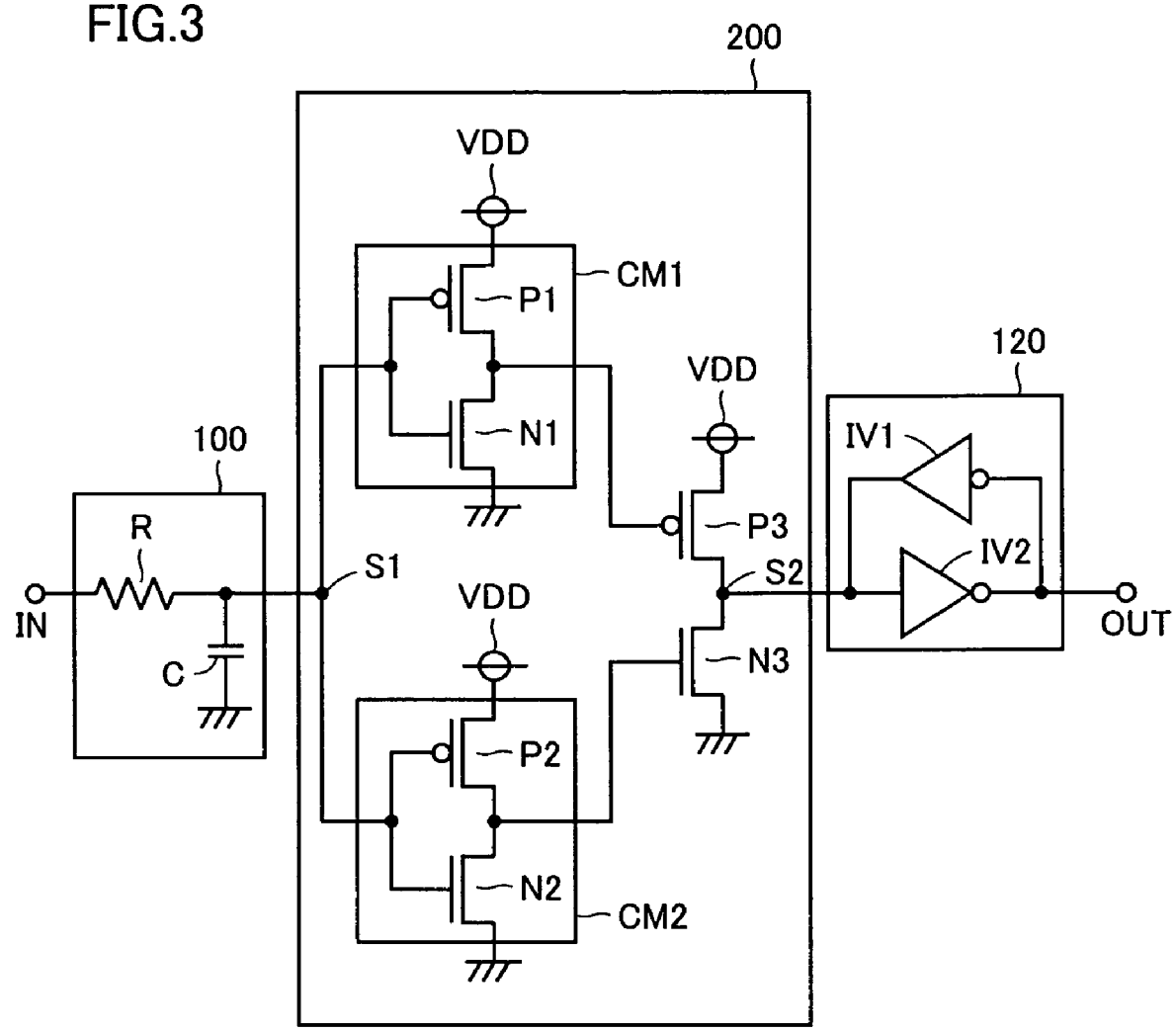
FIG. 3 shows a configuration of a pulse width measurement circuit of the first embodiment.

FIG. 3 shows a configuration of pulse width measurement circuit 5. With reference to the figure, pulse width measurement circuit 5 includes a CR integration circuit 100, a Schmitt trigger circuit 200 and a bistable circuit 120. The signal output from EXOR circuit 4 has its waveform blunted by CR integration circuit 100 formed of a resistor R and a capacitor C. A CMOS inverter CM1 has a threshold potential Vth1 corresponding to a trigger potential and larger than a threshold potential Vth2 of a CMOS inverter CM2 for the sake of illustration.

When a point S1 has a potential larger than threshold value Vth1, CMOS inverters CM1 and CM2 both output a potential of the low level. A PMOS transistor P3 turns on and NMOS transistor N3 turns off, and a point S2 has a potential attaining the high level.

Thereafter when the point S1 potential drops to no more than Vth1, CMOS inverter CM1 outputs a potential of the high level, whereas CMOS inverter CM2 outputs a potential remaining low. PMOS transistor P3 turns off, while NMOS transistor N3 remains off, and the point S2 potential remains high.

Thereafter when the point S1 potential drops to no more than Vth2, CMOS inverters CM1 and CM2 both output a potential of the high level. PMOS transistor P3 turns off and NMOS transistor N3 turns on, and the point S2 potential attains the low level.

Bistable circuit 120, formed of two inverters IV1 and IV2 holds the point S2 potential and also outputs it to latch circuit 6.

Thus pulse width measurement circuit 5 has a hysterisis characteristic allowing a reference threshold voltage for an input signal increasing in value and a different reference threshold voltage for an input signal decreasing in value. The CMOS inverter CM1 threshold potential Vth1, i.e., the trigger potential is so set that when EXOR circuit 4 outputs a signal having a pulse width of no less than a predetermined pulse width bistable circuit 120 outputs the high level and when EXOR circuit 4 outputs a signal having a pulse width of less than the predetermined pulse width bistable circuit 120 outputs the low level.

Figure 4A:
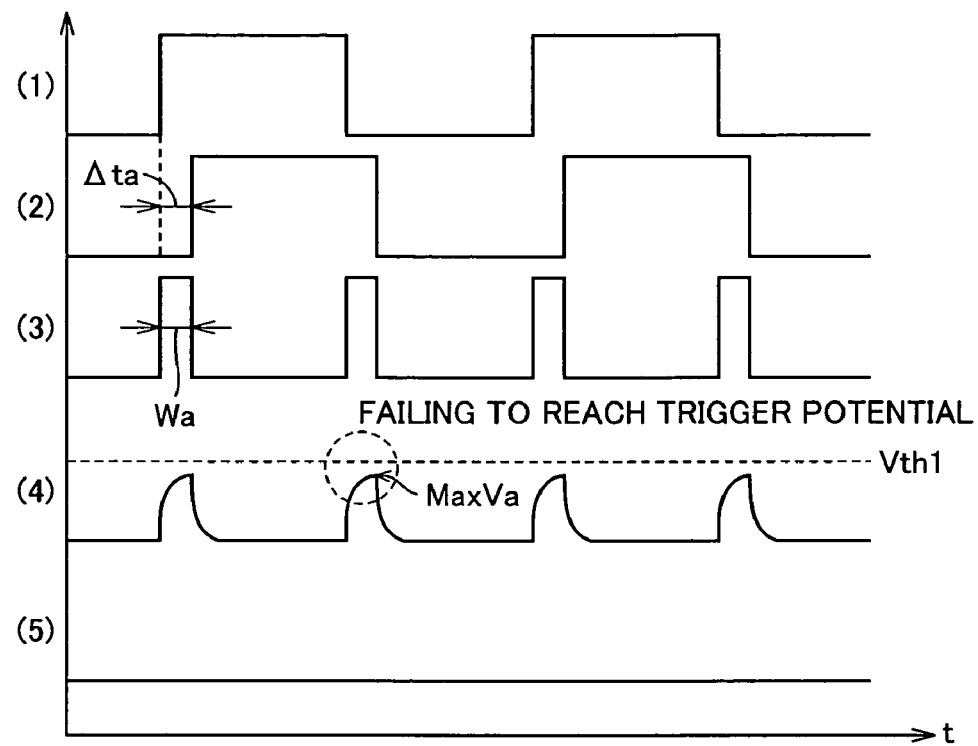
FIG. 4A represents each signal's or potential's variation for small temperature variation and FIG. 4B represents that for large temperature variation.

FIG. 4A represents each signals or potential's variation for small temperature variation.

Clock divider circuit 1 outputs a divided clock, as indicated in the figure by (1).

Delay circuit 85 outputs a delayed, divided clock, as indicated in the figure by (2). Because of small temperature variation, a delay time Δtb is small.

EXOR circuit 4 outputs a signal, as indicated in the figure by (3). Since delay time Δta is small, the output signal's pulse width Wa is small.

In pulse width measurement circuit 5 CR integration circuit 100 blunts the waveform of the pulse of the signal output from EXOR circuit 4. Consequently in pulse width measurement circuit 5 the point S1 potential attains a potential, as indicated in the figure by (4). Since the output signal's pulse width Wa is small, the point S1 maximum potential MaxVa is low and does not reach the trigger potential, i.e., threshold potential Vth1 of CMOS inverter CM1.

Pulse width measurement circuit 5 outputs a signal, as indicated in the figure by (5). Since the point S1 maximum potential MaxVa is no more than threshold potential Vth1 of CMOS inverter CM1, pulse width measurement circuit 5 outputs the low level.

Figure 4B:
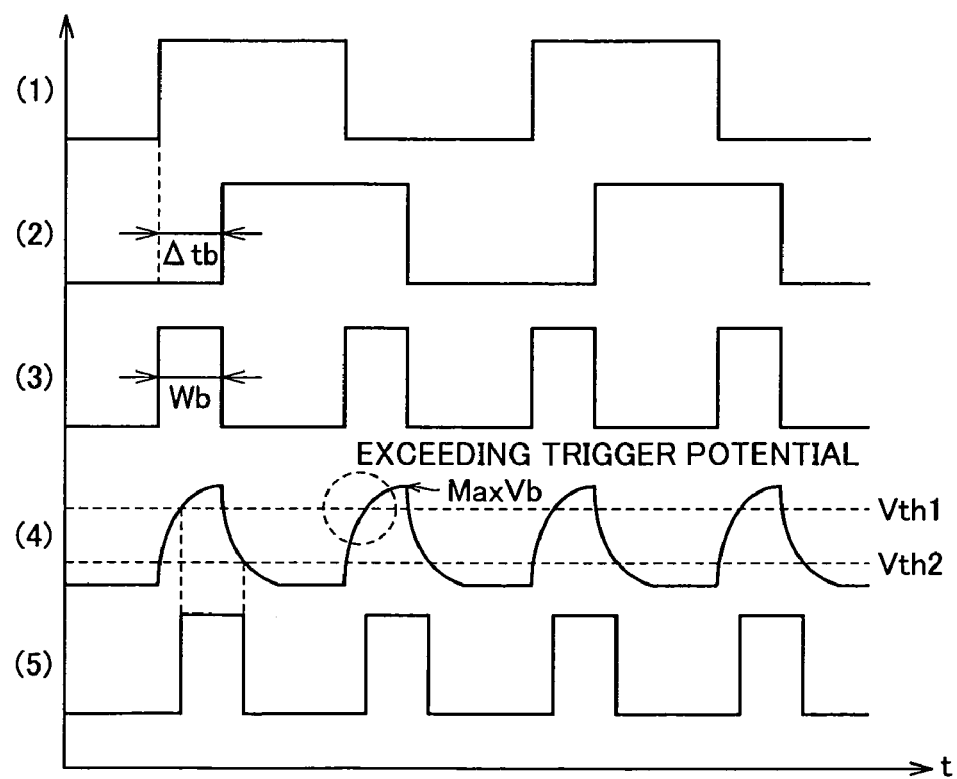

FIG. 4B represents each signal's or potential's variation for large temperature variation.

Clock divider circuit 1 outputs a divided clock, as indicated in the figure by (1).

Delay circuit 85 outputs a delayed, divided clock, as indicated in the figure by (2). Because of the larger temperature variation, a delay time Δtb is large.

EXOR circuit 4 outputs a signal, as indicated in the figure by (3). Since delay time Δtb is large, the output signal's pulse width Wb is large.

In pulse width measurement circuit 5 CR integration circuit 100 blunts the waveform of the pulse output from EXOR circuit 4. Consequently in pulse measurement circuit 5 the point S1 potential attains a potential, as indicated in the figure by (4). Since the output signal's pulse width Wb is large, the point S1 maximum potential MaxVb is high and exceeds the trigger potential, i.e., threshold potential Vth1 of CMOS inverter CM1.

Pulse width measurement circuit 5 outputs a signal, as indicated in the figure by (5). Because of its hysterisis characteristic, pulse width measurement circuit 5 continues to output a pulse of the high level after the point S1 potential exceeds threshold potential Vth1 of CMOS inverter CM1 and before it becomes smaller than threshold potential Vth2 of CMOS inverter CM2.

When pulse width measurement circuit 5 outputs a signal of the high level, latch circuit 6 latches the high level. When pulse width measurement circuit 5 does not output a signal of the high level, i.e., continues to output the low level, latch circuit 6 latches the low level.

Register 10 holds a latch signal. The latch signal in register 10 is output in response to a read signal (not shown) through an output terminal externally in parallel. This allows an external peripheral circuit to be notified of the microcomputer's internal temperature and an external display circuit to display temperature. In the external peripheral circuit it becomes possible that in response to detection of high temperature a cooler device is driven and in response to detection of low temperature a heater device is driven. Furthermore in the external peripheral circuit it also becomes possible to switch to a low-grade control circuit operating in a wide range of temperature as a fail safe function.

Thus the present embodiment can provide a microcomputer including a pulse width measurement circuit configured of CR integration circuit 100 and Schmitt trigger circuit 200 to allow a simple configuration to be used to detect the microcomputer's internal temperature.

Note that while the delay circuit includes two inverters by way of example, it may include a number of inverters that accommodates a temperature desired to be detected.

Second Embodiment

The present embodiment relates to a microcomputer including a temperature detection circuit using instead of a divided clock a rising signal output from a register to detect temperature.

Figure 5:
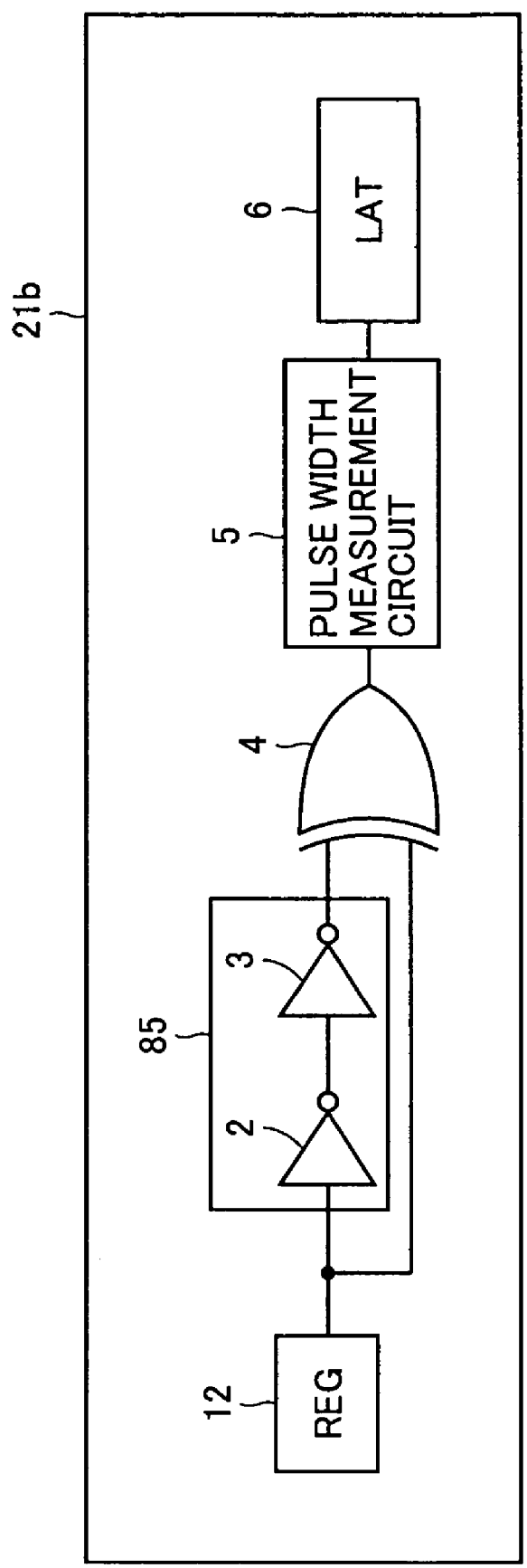
FIG. 5 shows a configuration of a temperature detection circuit of a second embodiment.

FIG. 5 shows a configuration of the temperature detection circuit of the second embodiment. With reference to the figure, a temperature detection circuit 21b includes a register 12 in place of clock divided circuit 1 of temperature detection circuit 21a of the first embodiment.

Register 12 holds data of a logic value of "1" and only when temperature is to be detected, register 12 operates in response to an externally applied control signal to output a rising signal.

Figure 6:
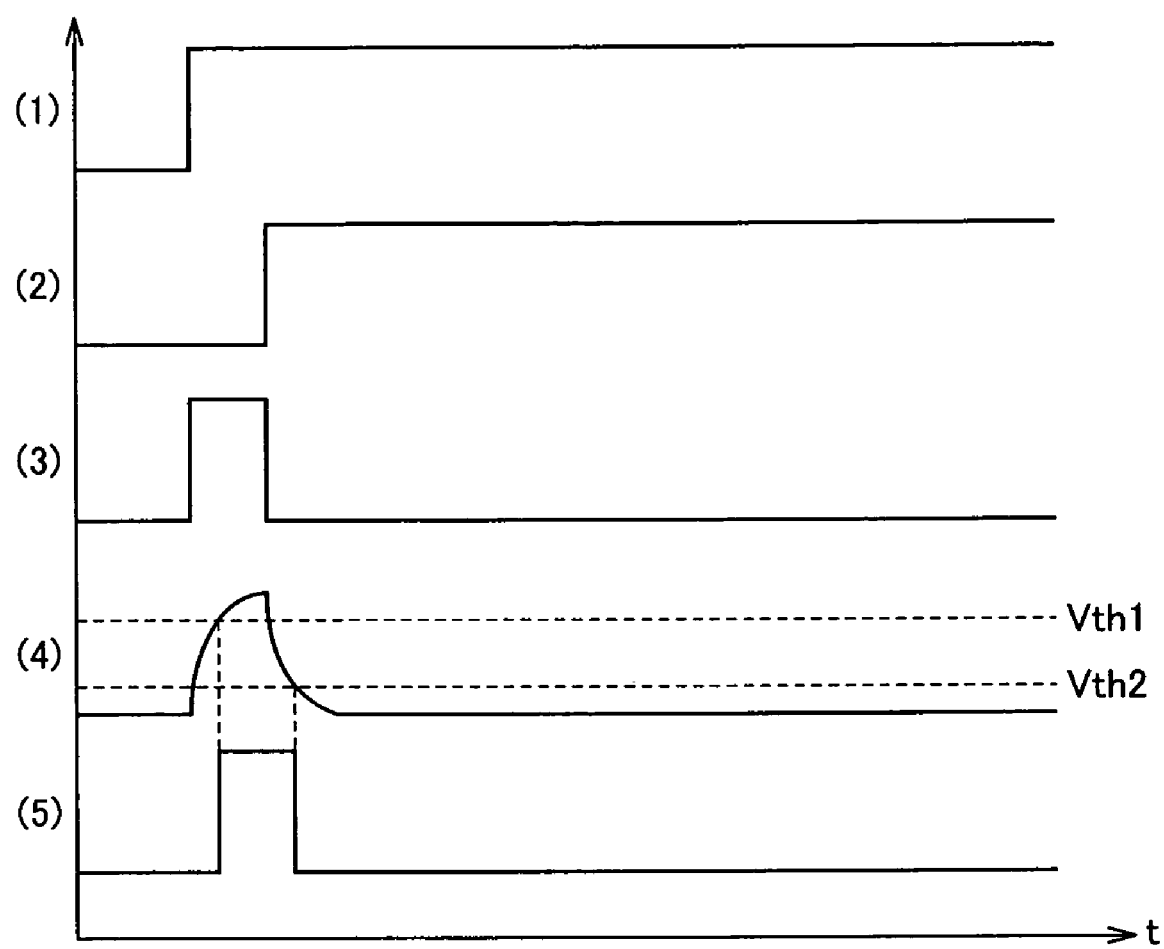
FIG. 6 represents each signal's or potential's variation.

FIG. 6 represents each signal's or potential's variation. Register 12 outputs a rising signal, as indicated in the figure by (1). Delay circuit 85 outputs a delayed signal, as indicated in the figure by (2). EXOR circuit 4 outputs a pulse, as indicated in the figure by (3). In pulse width measurement circuit 5 point S1 has a potential, as indicated in the figure by (4). Pulse width measurement circuit 5 outputs a signal, as indicated in the figure by (5).

Thus the present embodiment provides a microcomputer allowing register 12, delay circuit 85, pulse width measurement circuit 5 and latch circuit 6 to operate only when temperature is to be detected. Current consumption when temperature is not detected can be reduced.

Note that while in the present embodiment register 12 is adapted to output a rising signal, it may output a falling signal.

Third Embodiment

The present embodiment relates to a microcomputer including a temperature detection circuit with a delay circuit provided external to the microcomputer.

Figure 7:
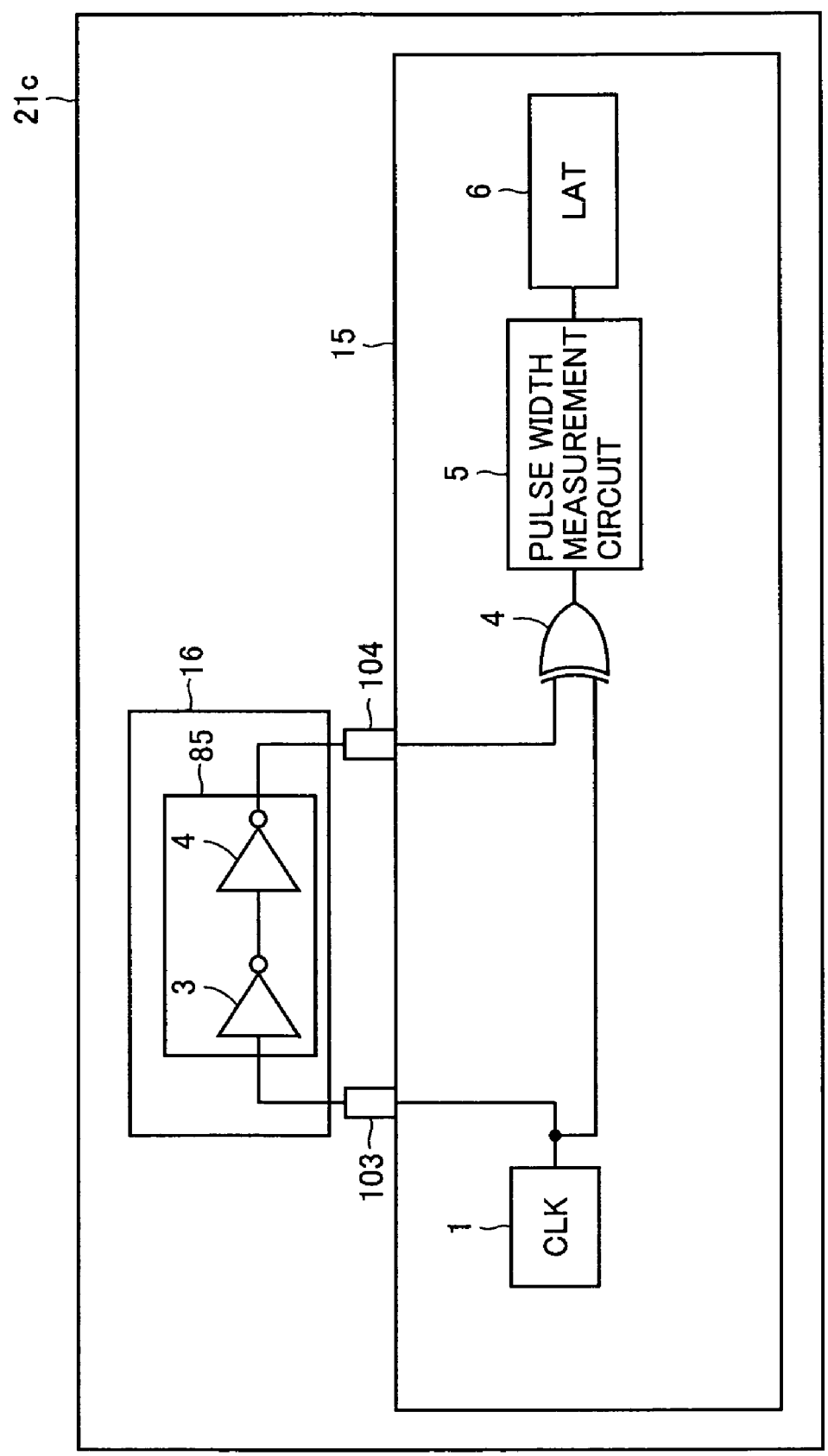
FIGS. 7–10 show configurations of temperature detection circuits of third to sixth embodiments, respectively.

FIG. 7 shows a configuration of the temperature detection circuit of the third embodiment. With reference to the figure, a temperature detection circuit 21c includes an external circuit 15 arranged external to the microcomputer, and an internal circuit 15 arranged internal to the microcomputer.

External circuit 16 is configured of delay circuit 85.

Internal circuit 15 includes clock divider circuit 1, EXOR circuit 4, pulse width measurement circuit 5 and latch circuit 6.

External and internal circuits 16 and 15 are connected through terminals 103 and 104.

Delay circuit 85 receives a divided clock transmitted through terminal 13, delays the divided clock, and transmits the delayed, divided clock through terminal 104 to EXOR circuit 4. Delay circuit 85, arranged external to the microcomputer, outputs a delayed clock having an amount of delay corresponding to the temperature external to the microcomputer.

The internal circuit 15 clock divider circuit 1, EXOR circuit 4, pulse width measurement circuit 5 and latch circuit 6 operate similarly as described in the first embodiment.

Thus the present embodiment provides a microcomputer allowing delay circuit 85 to be provided external thereto, so that temperature external to the microcomputer can be detected, and variation in temperature internal to the microcomputer that is attributed to the temperature external to the microcomputer can previously be detected. This allows an approach to be taken before the microcomputer's internal temperature varies.

Furthermore, with delay circuit 85 arranged external to the microcomputer, adjusting the number of inverters externally configuring delay circuit 85 can set to any desired value an amount of delay of a delayed clock provided by delay circuit 16.

Fourth Embodiment

The present embodiment relates to a microcomputer including a temperature detection circuit with a pulse width measurement circuit arranged external to the microcomputer.

Figure 8:
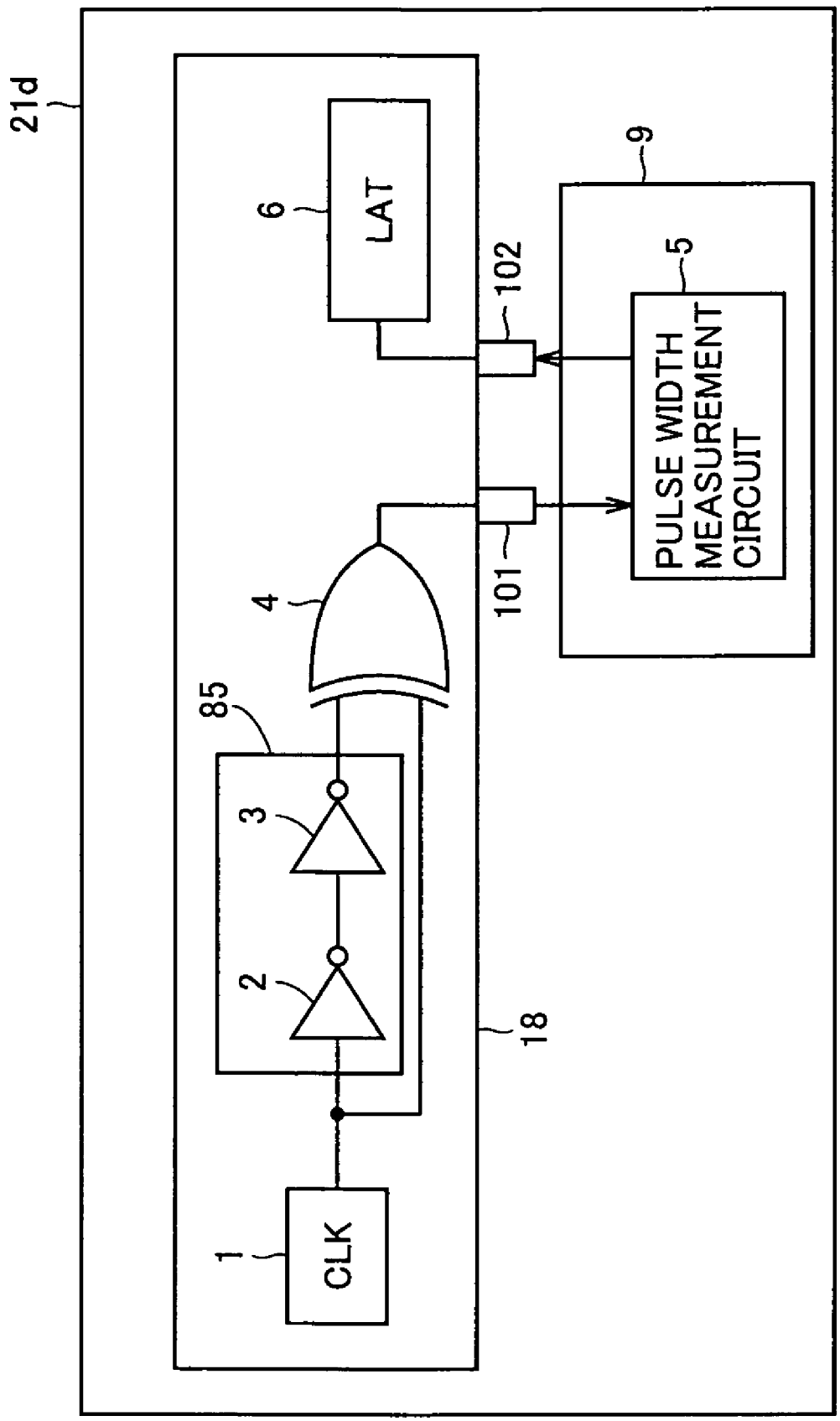

FIG. 8 shows a configuration of the temperature detection circuit of the fourth embodiment. With reference to the figure, a temperature detection circuit 21d includes an external circuit 9 arranged external to the microcomputer and an internal circuit 18 arranged internal to the microcomputer.

External circuit 9 is configured of pulse width measurement circuit 5.

Internal circuit 18 includes clock divider circuit 1, delay circuit 85, EXOR circuit 4, and latch circuit 6.

External and internal circuits 9 and 18 are connected through terminals 101 and 102.

The internal circuit 18 clock divider circuit 1, EXOR circuit 4, delay circuit 85 and latch circuit 6 operate similarly as described in the first embodiment.

When pulse width measurement circuit 5 receives from EXOR circuit 4 through terminal 101 a signal having a pulse of no less than a predetermined width, it outputs data of the high level through terminal 102 to latch circuit 6. When pulse width measurement circuit 5 receives from EXOR circuit 4 a signal having a pulse of less than the predetermined width, it outputs data of the low level through terminal 102 to latch circuit 6.

Thus the present embodiment provides a microcomputer allowing pulse width measurement circuit 5 arranged external thereto, so that changing a predetermined pulse width that determines an output signal's value can be facilitated, and a range of temperature to be detected can be readily set to any value.

Fifth Embodiment

The present embodiment relates to a microcomputer including a temperature detection circuit using a digital filter to detect temperature.

Figure 9:
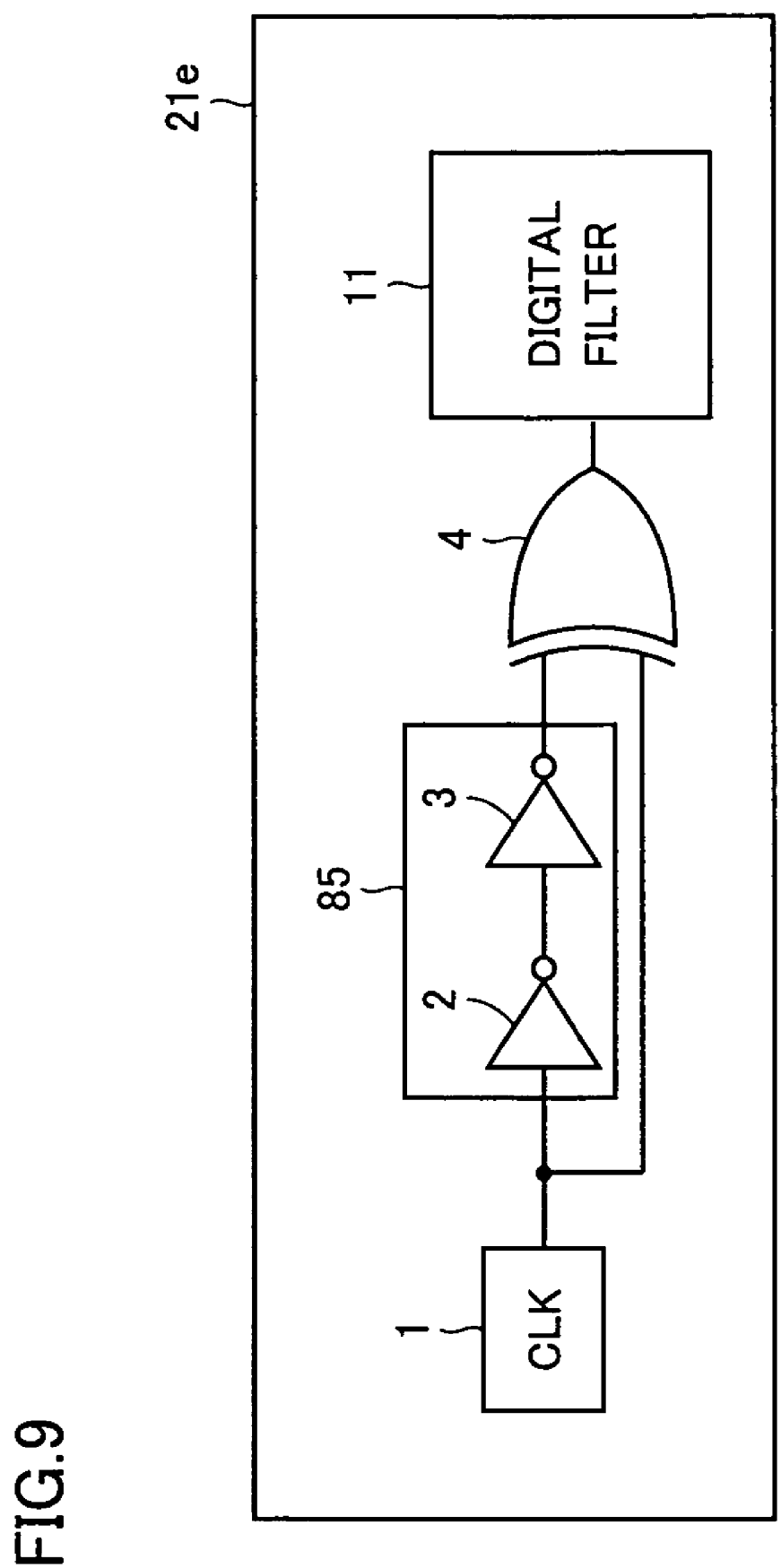

FIG. 9 shows a configuration of the temperature detection circuit of the fifth embodiment. With reference to the figure, a temperature detection circuit 21e includes a digital filter 11 in place of pulse width measurement circuit 5 and latch circuit 6 in temperature detection circuit 21a of the first embodiment shown in FIG. 2.

Digital filter 11 receives a signal from EXOR gate 4, converts the signal's pulse width to a digital value, and outputs the digital value to register 10 of FIG. 1. Digital filter 11 allows temperature to be detected more specifically than the pulse width detection circuit.

Thus the present embodiment provides a microcomputer allowing pulse width measurement circuit 5 and latch circuit 6 to be replaced with digital filter 11, so that a reduced number of elements can be used and temperature can be detected more specifically.

Sixth Embodiment

The present embodiment relates to a microcomputer including a temperature detection circuit simply configured to detect temperature.

Figure 10:
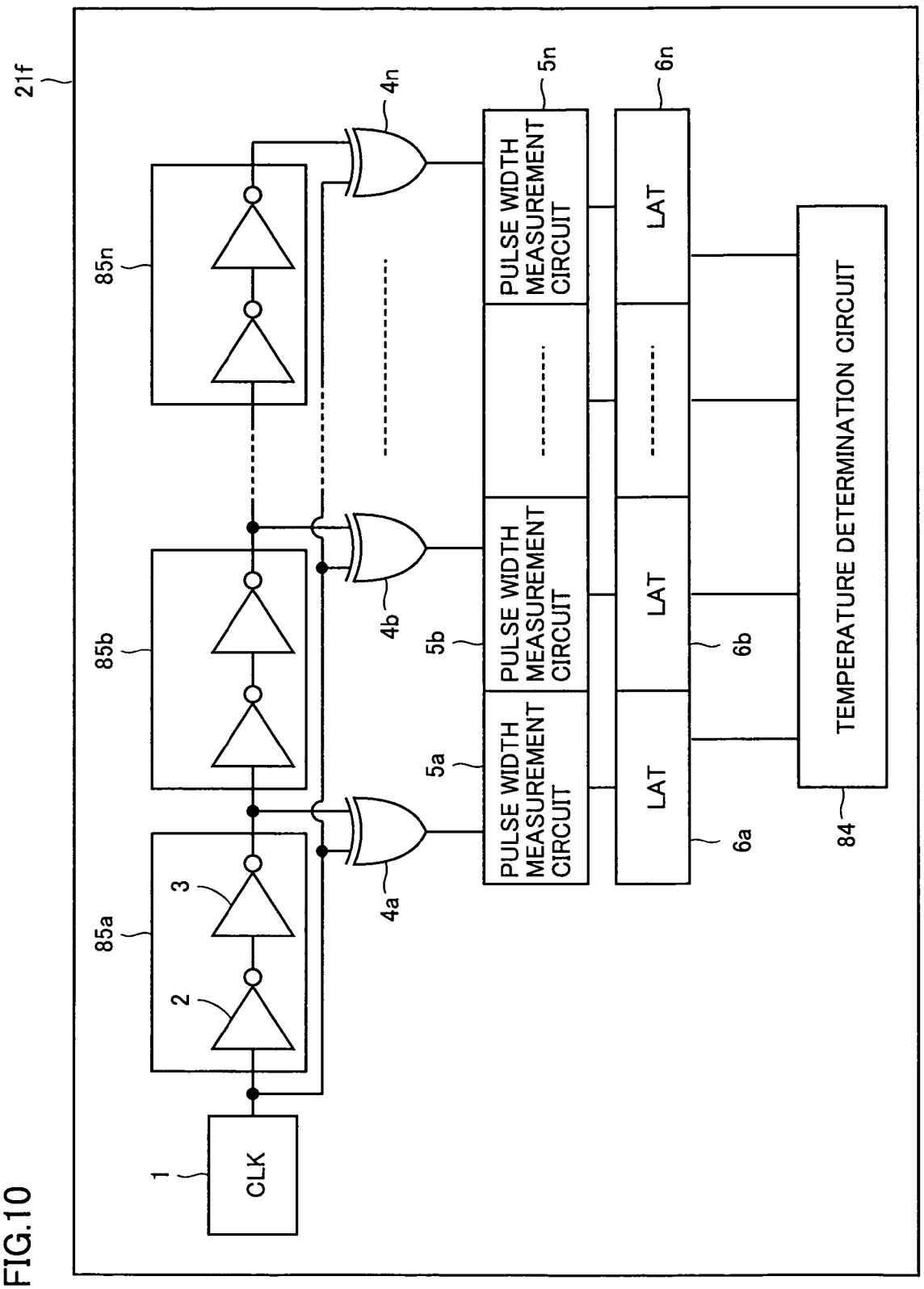

FIG. 10 shows a configuration of the temperature detection circuit of the sixth embodiment. With reference to the figure, a temperature detection circuit 21f includes dock divider circuit 1, a plurality of delay circuits 85a–85n, a plurality of EXOR circuits 4a–4n, a plurality of pulse width measurement circuits 5a–5n, and a plurality of latch circuits (LATs) 6a–6n. These components are similar in configuration and hence operation to those described in the first embodiment.

Clock divider circuit 1 receives an external clock supplied external to temperature detection circuit 21g, divides the clock, and outputs a divided clock.

Delay circuits 85a–85n are each configured of inverters 2 and 3 and connected in series. The divided clock output from clock divider circuit 1 is delayed as it passes through these inverters, and delay circuits 85a–85n each output a delayed, divided clock.

EXOR circuits 4a–4n are provided to correspond to delay circuits 85a–85n, respectively, and each perform an exclusive OR (EXOR) operation on the divided clock output from clock divider circuit 1 and the delayed, divided clock output from the corresponding delay circuit 85a–85 to output the operation's result.

When pulse width measurement circuits 5a–5n receive from their respective EXOR circuits 4 a signal having a pulse width of no less than a predetermined value, pulse width measurement circuit 5a–5n output a signal of the high level. When pulse width measurement circuits 5a–5n receive from their respective EXOR circuits 4 a signal having a pulse width of less than the predetermined value, they output a signal of the low level.

When latch circuits 6a–6n receive a signal of the high level from their respective pulse width measurement circuits 5a–5n, latch circuits 6a–6n latch the high level. When pulse width measurement circuits 5a–5n do not output a signal of the high level, i.e., continue to have the low level, the latch circuits latch the low level.

FIGS. 11A and 11B indicate values of signals latched by latch circuits 6a–6n. FIG. 11A indicates values of signals latched by latch circuits 6a–6n for a temperature variation Δt1, and FIG. 11B indicates those of signals latched by latch circuits 6a–6n for a temperature variation Δt2 (>Δt1). As shown in the figures, for the smaller temperature variation, any latch circuit that latches a signal of the high level is limited to a subsequent latch (in FIG. 10, closer to the right-hand side).

This is because for small temperature variation, it is not until delay is provided via a large number of delay circuits when a pulse width measurement circuit receives a signal having a pulse width of no less than a predetermined value, whereas for large temperature variation, even when delay is provided via a small number of delay circuits a pulse width measurement circuit still receives a signal having a pulse width of no less than the predetermined value.

A temperature determination circuit 84 counts the total number of latch circuits latching a signal of the high level in value, and stores the count value as data indicative of temperature to register 10 shown in FIG. 1.

The count value stored in register 10 is output in response to a read signal (not shown) through an output terminal externally in parallel. This allows an external peripheral circuit to be notified of the microcomputer's internal temperature and an external display circuit to display temperature.

Thus the present embodiment provides a microcomputer eliminating a redundant portion and thus simply configured to detect temperature more specifically.

Note that while in the present embodiment temperature determination circuit 84 counts the total number of latch circuits latching a signal of the high level in value and stores the count value to register 10, it is not limited thereto. For example, temperature determination circuit 84 stores a table which determines a correspondence between a count value and a temperature. This table correlates larger count values with higher temperatures. Temperature determination circuit 84 may count the total number of latch circuits latching a signal of the high level in value, determine with reference to the table the temperature corresponding to the count value, and store the temperature to register 10.

Seventh Embodiment

The present embodiment relates to a microcomputer including a temperature detection circuit simply configured to detect temperature.

Figure 12:
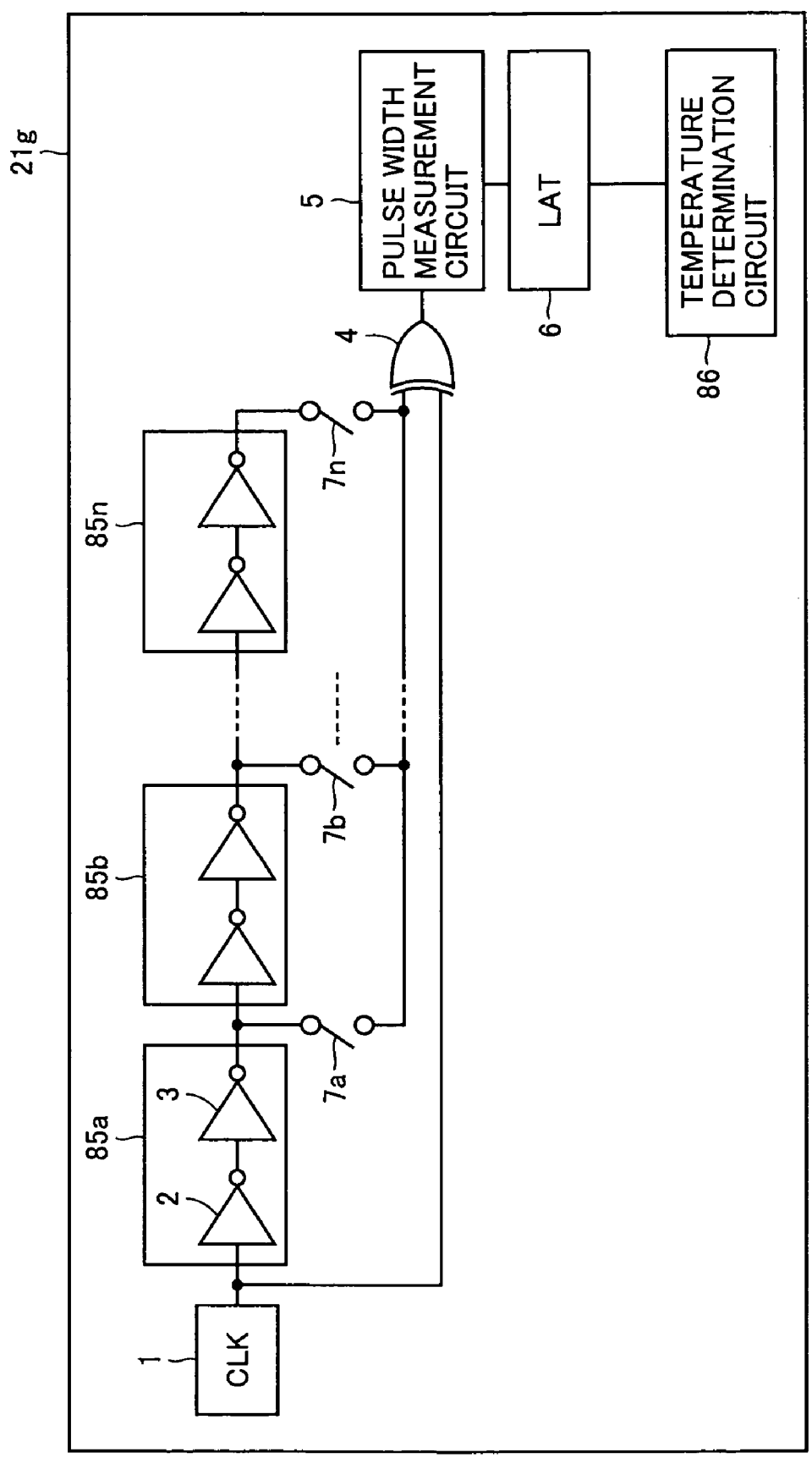
FIG. 12 shows a configuration of a temperature detection circuit of a seventh embodiment.

FIG. 12 shows a configuration of the temperature detection circuit of the seventh embodiment. With reference to the figure, a temperature detection circuit 21g includes clock divider circuit 1, a plurality of delay circuits 85a–85n, a plurality of switches 7a–7n, EXOR circuit 4, pulse width measurement circuit 5, and latch circuit (LAT) 6. These components are similar in configuration and hence operation to those described in the first embodiment.

Clock divider circuit 1 receives a reference clock supplied external to temperature detection circuit 21g, divides the reference clock and outputs a divided clock.

Delay circuits 85a–85n, each formed of inverters 2 and 3, are connected in series. The divided clock output from clock divider circuit 1 is delayed as it passes through these inverters, and delay circuits 85a–85n output delayed, divided clocks, respectively.

The plurality of switches 7a–7n receive delayed, divided clocks from their respectively corresponding delay circuits. Of the plurality of switches 7a–7n, only one switch is selected and turned on.

EXOR circuit 4 receives a divided clock output from clock divider circuit 1 and, via a switch turned on, the divided clock that has been delayed as it has passed through a single or a plurality of delay circuits. EXOR circuit 4 performs an exclusive OR (EXOR) operation on the divided clock and the delayed, divided clock and outputs the operation's result.

Depending on which switch has turned on, EXOR circuit 4 receives a delayed, divided clock with a different delay time, and as a result, EXOR circuit 4 outputs a signal having a pulse varying in width.

When EXOR circuit 4 outputs a pulse having a width of no less than a predetermined value, pulse width measurement circuit 5 outputs a signal of the high level, and when circuit 4 outputs a pulse having a width of less than the predetermined value, circuit 5 outputs a signal of the low level.

When pulse width measurement circuit 5 outputs a signal of the high level, latch circuit 6 latches the high level. When circuit 5 does not output a signal of the high level, i.e., it continues to output the low level, circuit 6 latches the low level.

In FIG. 12, initially the most leftward switch and then the subsequent, rightward switches are successively turned on. While one switch is turned on, the other switches are turned off. When latch circuit 6 latches a signal of the high level for the first time, temperature determination circuit 86 determines the number of the switch that is currently turned on, and circuit 86 stores the switch's number as data indicative of temperature to register 10 of FIG. 1.

Thus the present embodiment provides a microcomputer eliminating a redundant portion and simply configured to detect temperature more specifically.

Note that while in the present embodiment when a latched signal's value attains the high level for the first time temperature determination circuit 86 stores to register 10 the number of a switch that is currently turned on, it is not limited thereto. For example, temperature determination circuit 86 has stored therein a table which determines a correspondence between the numbers of switches and temperature. In this table, a more leftward switch as seen in FIG. 12 has its number correlated with a higher temperature. Temperature determination circuit 86 may refer to this table, and when a latched signal's value attains the high level for the first time, circuit 86 may determine the number of the switch that is currently turned on, determine the temperature corresponding to the switch's number, and store the temperature to register 10.

Eighth Embodiment

The present embodiment relates to a microcomputer notifying peripheral equipment of temperature.

Figure 13:
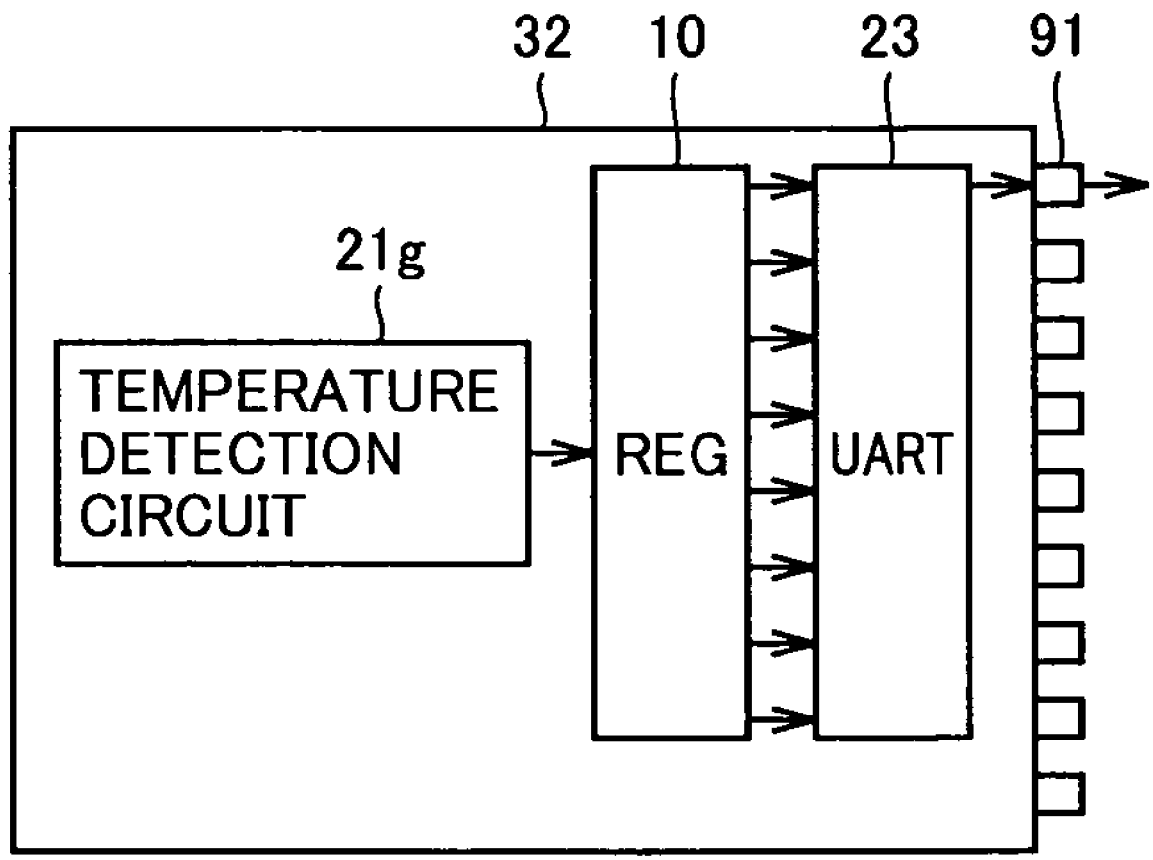
FIGS. 13–17 show configurations of microcomputers of eighth to twelfth embodiments, respectively.

FIG. 13 shows a configuration of the microcomputer of the eighth embodiment. With reference to the figure, a microcomputer 32 includes temperature detection circuit 21*g* of the seventh embodiment, register 10, and a universal asynchronous receiver transmitter (UART) circuit 23.

UART circuit 23 receives temperature data transmitted from register 10 in parallel, converts the data to serial data, and outputs the serial data through an output terminal 91 to external peripheral equipment.

Thus the present embodiment provides a microcomputer capable of using serial communication to notify peripheral equipment communicating data, of temperature.

Note that while the present embodiment employs the temperature detection circuit of the seventh embodiment, it may use those of the first to sixth embodiments.

Ninth Embodiment

The present embodiment relates to a microcomputer performing a reset process when temperature has no less than a predetermined value.

Figure 14:
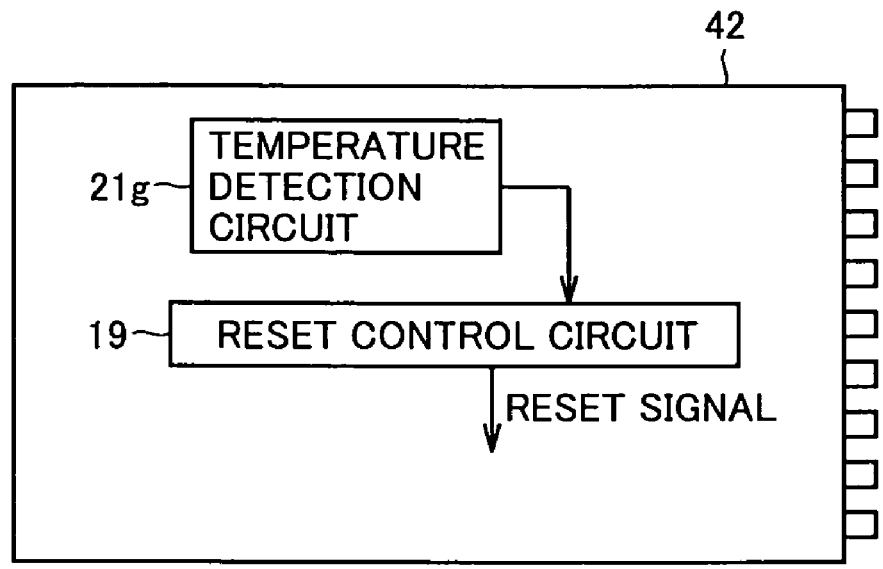

FIG. 14 shows a configuration of the microcomputer of the ninth embodiment. With reference to the figure, a microcomputer 42 includes temperature detection circuit 21*g* of the seventh embodiment, and a reset control circuit 19.

When temperature detection circuit 21*g* outputs a signal having no less than a predetermined level, the microcomputer's normal operation is not expected, and reset control circuit 19 outputs a reset signal to the microcomputer's internal circuits-to initialize the circuits.

When a temperature exceeding that which ensures a microcomputer's operation is detected, there is a high probability that the microcomputer is not normally operating. The present embodiment provide a microcomputer allowing its internal circuits to be reset to be initialized.

Note that while the present embodiment has employed the temperature detection circuit of the seventh embodiment, it may alternatively use those of the first to sixth embodiments.

Tenth Embodiment

The present embodiment relates to a microcomputer performing an interrupt process for temperatures of no less than a predetermined value.

Figure 15:
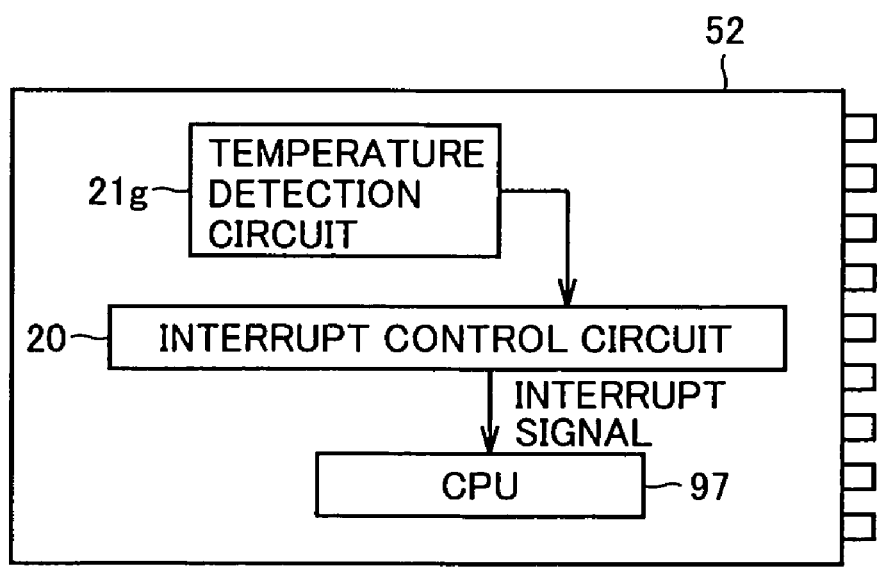

FIG. 15 shows a configuration of the microcomputer of the tenth embodiment. With reference to the figure, a microcomputer 52 includes temperature detection circuit 21*g* of the seventh embodiment, an interrupt control circuit 20, and a CPU 97.

When temperature detection circuit 21*g* outputs a signal of no less than a predetermined level, the microcomputer's normal operation is not expected. Accordingly, interrupt control circuit 20 transmits an interrupt signal to the microcomputer's CPU 97 to cause CPU 97 to execute an interrupt process.

CPU 47 having received the interrupt signal terminates a currently executing program and also executes a program to display a message indicating that the execution of the current program has been suspended.

When a temperature exceeding that which ensures a microcomputer's operation is detected, there is a high probability that the microcomputer is not normally operating. Accordingly in the present embodiment there is provided a microcomputer causing a CPU to execute an interrupt process.

Note that while in the present embodiment the CPU having received an interrupt signal terminates a currently executing program and also executes a program to display a message that the currently executing program has been terminated, it is not limited thereto. For example, an interrupt process signal may be transmitted to an internal power supply circuit, and when an interrupt signal is received by the internal power supply circuit, power supply may be turned off. Alternatively, an interrupt signal may be transmitted to a clock divider circuit, and when the interrupt signal is received by the clock divider circuit, a division ration may be changed to output a clock of a low frequency.

Note that while the present embodiment has employed the temperature detection circuit of the seventh embodiment, it may alternatively use those of the first to sixth embodiments.

Eleventh Embodiment

The present embodiment relates to a microcomputer driven by a resultant detection provided by a temperature detection circuit to control a clock for operation.

Figure 16:
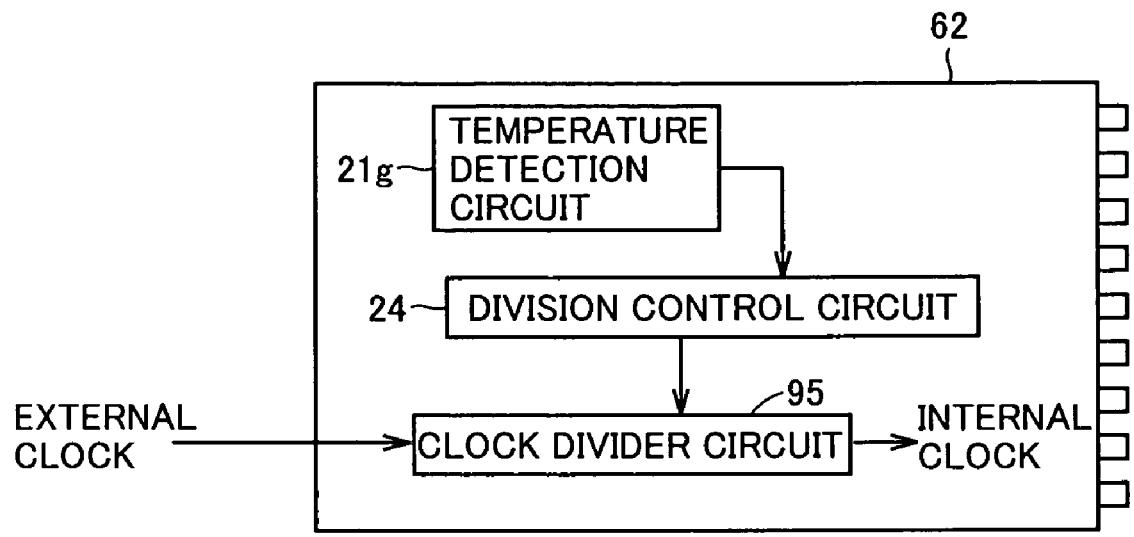

FIG. 16 shows a configuration of the microcomputer of the eleventh embodiment. With reference to the figure, a microcomputer 62 includes temperature detection circuit 21g of the seventh embodiment, a clock divider circuit 95, and a division control circuit 24.

Division control circuit 24 outputs to clock divider circuit 95 a division ratio corresponding to temperature data transmitted from temperature detection circuit 21g. More specifically, division control circuit 24 outputs a division ratio of one for $\theta \leq$ a temperature variation $\Delta t < \alpha$, a division ratio of two for $\alpha \leq \Delta t < \beta$ and a division ratio of four for $\beta \leq \Delta t < \gamma$. In other words, when temperature has larger variation, a microcomputer operated by a clock of a higher frequency provides unstable operation. Accordingly, the microcomputer is operated by a clock of a lower frequency.

Clock divider circuit 95 uses a division ratio received from division control circuit 24 to divide an externally supplied external clock and output the divided clock as the microcomputer's operating clock.

Thus the present embodiment provides a microcomputer driven by a temperature detected by a temperature detection circuit to select a clock of an appropriate frequency as a clock for operation.

Note that clock divider circuit 95 may be replaced with a shift circuit allowing a shift to a low-speed mode, a low consumption mode, a wait mode or a stop mode.

Note that while the present embodiment has employed the temperature detection circuit of the seventh embodiment, it may alternatively use those of the first to sixth embodiments.

Twelfth Embodiment

The present embodiment relates to a microcomputer.

Figure 17:
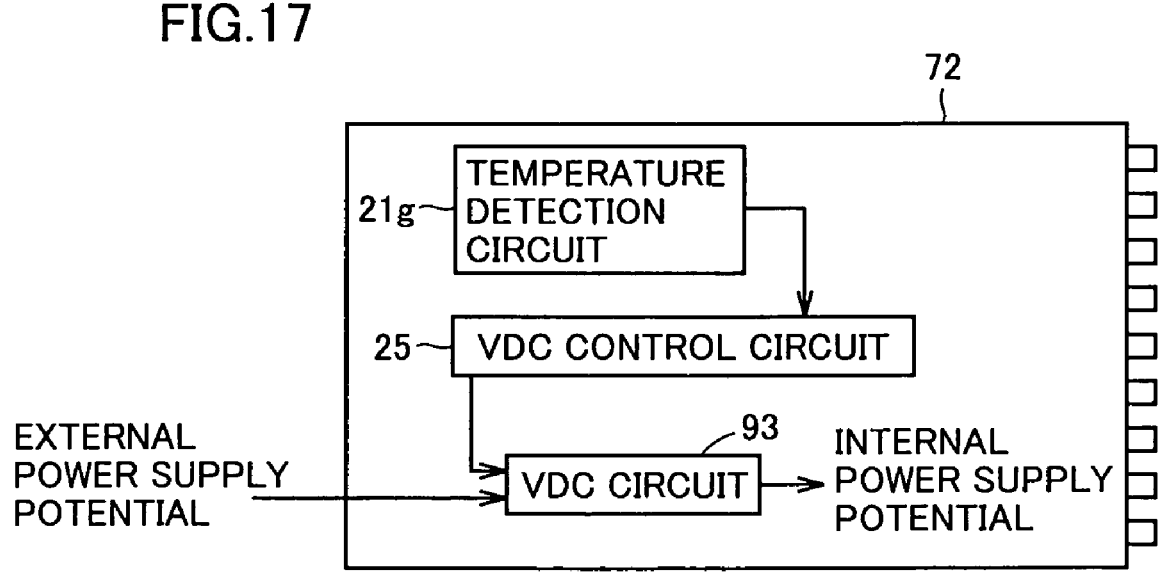

FIG. 17 shows a configuration of the microcomputer of the twelfth embodiment. With reference to the figure, a microcomputer 72 includes temperature detection circuit 21g of the seventh embodiment, a voltage down converter (VDC) control circuit 25, and a VDC circuit 93.

When VDC circuit 93 receives an instruction from VDC control circuit 25 to drop potential, VDC circuit 93 lowers an external power supply potential to generate and output an internal power supply potential. When VDC circuit 93 does not receive the instruction, VDC circuit 93 outputs the exact external power supply potential as an internal power supply potential.

VDC control circuit 25 is driven by temperature data transmitted from temperature detection circuit 21g to control VDC circuit 93 dropping a potential. More specifically, when the temperature data indicates a temperature of no less than a predetermined value, a large current is consumed and a transistor has an overcurrent flowing therethrough and can be destroyed. Accordingly, VDC control circuit 25 controls VDC circuit 93 to perform voltage down conversion.

Thus the present embodiment provides an microcomputer wherein when a temperature detection circuit detects high temperature an internal power supply potential can be dropped to prevent destruction of circuits internal to the microcomputer.

Note that while the present embodiment has employed the temperature detection circuit of the seventh embodiment, it may alternatively use those of the first to sixth embodiments.

Note that the register of the second embodiment can be used in the third to seventh embodiments.

Also note that the method of separating external and internal circuits in the third and fourth embodiments may also be used in the second and fifth to seventh embodiments.

The digital filter of the fifth embodiment may also be used in the second to fourth embodiments.

The pulse width measurement circuits in the second to fourth and sixth to twelfth embodiments are not limited to that in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit comprising a temperature detection circuit including:

a signal output circuit outputting a first signal having at least one rising or falling portion;

a delay circuit connected to the signal output circuit and formed of at least one inverter to output a delayed version of said first signal;

a logic circuit receiving said first signal and said delayed version of said first signal;

a pulse width measurement circuit outputting a signal asserted in response to a signal directly received from said logic circuit having a pulse with a width of no less than a predetermined width corresponding to a temperature desired to be detected; and a latch circuit latching a signal output from said pulse width measurement circuit, said pulse width measurement circuit having an integration circuit receiving a signal output from said logic circuit and a Schmitt trigger circuit receiving a signal output from said integration circuit, said Schmitt trigger circuit having a trigger potential set to have a value corresponding to said predetermined width.

2. The semiconductor integrated circuit according to claim 1, wherein said delay circuit is arranged external to said semiconductor integrated circuit.

3. The semiconductor integrated circuit according to claim 1, wherein said pulse width measurement circuit is arranged external to said semiconductor integrated circuit.

* * * * *